US012693802B2

(12) United States Patent
Kim

(10) Patent No.: US 12,693,802 B2
(45) Date of Patent: Jul. 28, 2026

(54) MEMORY CONTROLLER AND MEMORY SYSTEM INCLUDING THE SAME

(71) Applicant: SK hynix Inc., Gyeonggi-do (KR)

(72) Inventor: Bo Kyeong Kim, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 413 days.

(21) Appl. No.: 18/175,548

(22) Filed: Feb. 28, 2023

(65) Prior Publication Data

US 2024/0094945 A1 Mar. 21, 2024

(30) Foreign Application Priority Data

Sep. 20, 2022 (KR) ........................ 10-2022-0118810

(51) Int. Cl.
*G06F 3/06* (2006.01)

(52) U.S. Cl.
CPC .......... *G06F 3/0656* (2013.01); *G06F 3/0604* (2013.01); *G06F 3/0652* (2013.01); *G06F 3/0683* (2013.01)

(58) Field of Classification Search
None
See application file for complete search history.

(56) References Cited

U.S. PATENT DOCUMENTS

| 11,586,385 B1* | 2/2023 | Lercari | G06F 12/0246 |
| 2017/0123718 A1* | 5/2017 | Sinha | G06F 3/0688 |
| 2021/0249094 A1* | 8/2021 | Lee | G11C 16/10 |
| 2022/0188236 A1* | 6/2022 | Ma | G11C 29/52 |
| 2022/0214808 A1* | 7/2022 | Lin | G06F 12/0246 |
| 2022/0237115 A1* | 7/2022 | Seo | G06F 12/0253 |
| 2022/0269440 A1* | 8/2022 | Lin | G06F 3/0604 |

FOREIGN PATENT DOCUMENTS

| KR | 10-2017-0104115 A | 9/2017 |
| KR | 10-2021-0070054 A | 6/2021 |

* cited by examiner

*Primary Examiner* — Baboucarr Faal
(74) *Attorney, Agent, or Firm* — IP & T GROUP LLP

(57) ABSTRACT

Provided herein may be a memory controller and a memory system including the same. The memory system may include a plurality of memory devices, each including a plurality of zone blocks, a buffer memory configured to store pieces of map data that are respectively allocated to a plurality of zones corresponding to logical address groups provided by a host and that indicate correspondence relationships between the plurality of zones and physical addresses of the plurality of zone blocks, and a memory controller configured to perform a data movement operation of storing data, which is stored in a zone block allocated to one of the plurality of zones, in an additional zone block based on information related to the plurality of zone blocks, and update a physical address of the zone block corresponding to the one zone to a physical address of the additional zone block.

9 Claims, 15 Drawing Sheets

|  | erase cnt | read cnt | num fb | bb_inf |
|---|---|---|---|---|
| ZB1 | 20 | 20 | 30 | 0 |
| ZB2 | 10 | 5 | 40 | 0 |
| ⋮ | ⋮ | ⋮ | ⋮ | ⋮ |
| ZBi | 5 | 25 | 30 | 0 |

FIG. 7 map data

| Zone_num | ZB_num | WP |
|---|---|---|
| Zone_1 | ZB1 | 3 |
| Zone_2 | ZB2 | 2 |
| ... | ... | ... |
| Zone_i | ZBi | 1 |

⇒ map data

| Zone_num | ZB_num | WP |
|---|---|---|
| Zone_1 | ZBp | 3 |
| Zone_2 | ZB2 | 2 |
| ... | ... | ... |
| Zone_i | ZBi | 1 |

ZBi: Datai-19

ZBn

⋮

ZB2: Data11, Data12

ZBp: Data1, Data2, Data3

ZB1: Data1, Data2, Data3

ZBp-1

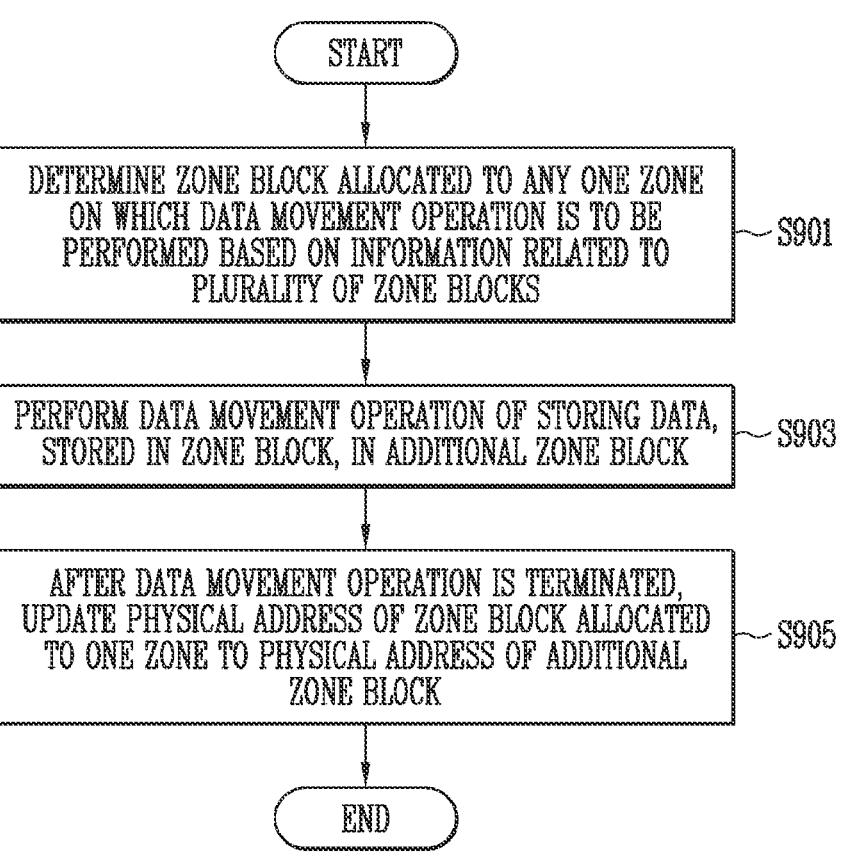

START

DETERMINE ZONE BLOCK ALLOCATED TO ANY ONE ZONE
ON WHICH DATA MOVEMENT OPERATION IS TO BE
PERFORMED BASED ON INFORMATION RELATED TO
PLURALITY OF ZONE BLOCKS — S901

PERFORM DATA MOVEMENT OPERATION OF STORING DATA,
STORED IN ZONE BLOCK, IN ADDITIONAL ZONE BLOCK — S903

AFTER DATA MOVEMENT OPERATION IS TERMINATED,
UPDATE PHYSICAL ADDRESS OF ZONE BLOCK ALLOCATED
TO ONE ZONE TO PHYSICAL ADDRESS OF ADDITIONAL
ZONE BLOCK — S905

END

MEMORY CONTROLLER AND MEMORY SYSTEM INCLUDING THE SAME

CROSS-REFERENCE TO RELATED APPLICATION

The present application claims priority under 35 U.S.C. § 119(a) to Korean patent application number 10-2022-0118810, filed on Sep. 20, 2022, the entire disclosure of which is incorporated herein by reference.

BACKGROUND

1. Field of Invention

Various embodiments of the present disclosure relate to an electronic device, and more particularly to a memory controller and a memory system including the memory controller.

2. Description of Related Art

A memory system may store data according to a request by a host device such as a computer or a smartphone. The memory system may include a memory device in which data is stored and a memory controller which controls the memory device. Memory devices are classified into volatile memory devices and nonvolatile memory devices.

The memory system may record locations at which data is stored by mapping relationships between logical addresses used by the host and physical addresses used by the memory device. Accordingly, when the host requests data stored in the memory device, the memory system may provide the data requested by the host with reference to corresponding relationships between logical addresses and physical addresses.

SUMMARY

Various embodiments of the present disclosure are directed to a memory controller that is capable of improving the speed at which data stored in a memory device is moved, and a memory system including the memory controller.

An embodiment of the present disclosure may provide for a memory system. The memory system may include a plurality of memory devices, each including a plurality of zone blocks, a buffer memory configured to store pieces of map data that are respectively allocated to a plurality of zones corresponding to logical address groups provided by a host and that indicate correspondence relationships between the plurality of zones and physical addresses of the plurality of zone blocks, and a memory controller configured to perform a data movement operation of storing data, which is stored in a zone block allocated to any one of the plurality of zones, in an additional zone block based on information related to the plurality of zone blocks, the additional zone block being allocated to the one of the plurality of zones, and update, after completion of the data movement operation on the zone block and the additional zone block, a physical address of the zone block corresponding to the one of the plurality of zones to a physical address of the additional zone block.

An embodiment of the present disclosure may provide for a memory system. The memory system may include a plurality of memory devices, each including a plurality of zone blocks, a buffer memory configured to store pieces of map data that are respectively allocated to a plurality of zones corresponding to logical address groups provided by a host and that indicate correspondence relationships between the plurality of zones and physical addresses of the plurality of zone blocks, a memory controller configured to suspend a data movement operation of storing data, which is stored in a zone block allocated to one of the plurality of zones, in an additional zone block in response to a request received from the host, the additional zone block being allocated to the one of the plurality of zones, and to update data stored in the additional zone block to invalid data.

An embodiment of the present disclosure may provide for a memory system. The memory system may include a plurality of memory devices, each including a plurality of zone blocks, a buffer memory configured to store pieces of map data that are respectively allocated to a plurality of zones corresponding to logical address groups provided by a host and that indicate correspondence relationships between the plurality of zones and physical addresses of the plurality of zone blocks, and a memory controller configured to suspend a data movement operation of storing data, which is stored in a zone block allocated to one of the plurality of zones, in an additional zone block in response to a sudden power-off occurring while the data movement operation is being performed based on information related to the plurality of zone blocks, the additional zone block being allocated to the one of the plurality of zones, and to update data stored in the additional zone block to invalid data.

An embodiment of the present disclosure may provide for a method of operating a controller. The method may include controlling a memory device to move data between two zone blocks on a zone block basis, and updating map data to reflect a result of the moving into the map data.

An embodiment of the present disclosure may provide for a method of operating a controller. The method may include controlling a memory device to cease, while moving data from a source zone block to a target zone block on a zone block basis, the moving, and invalidating one or more data pieces stored in the target zone block, the stored data pieces being caused by the moving.

BRIEF DESCRIPTION OF THE DRAWINGS

FIG. 2 is a diagram illustrating the structure of a memory device of FIG. 1 according to an embodiment of the present disclosure.

FIG. 4 is a diagram illustrating a memory device including a plurality of zones allocated to a zone buffer and a plurality of zone blocks allocated to respectively correspond to the plurality of zones according to an embodiment of the present disclosure.

FIG. 7 is a diagram illustrating a data movement operation and a map update operation of a memory system according to an embodiment of the present disclosure.

FIG. 8 is a diagram illustrating a data movement operation of a memory system according to an embodiment of the present disclosure.

FIG. 9 is a flowchart for describing a data movement operation of a memory system according to an embodiment of the present disclosure.

DETAILED DESCRIPTION

Specific structural or functional descriptions in the embodiments of the present disclosure introduced in this specification are provided as examples to describe embodiments according to the concept of the present disclosure. The embodiments according to the concept of the present disclosure may be practiced in various forms, and should not be construed as being limited to the embodiments described in this specification.

Figure 1:
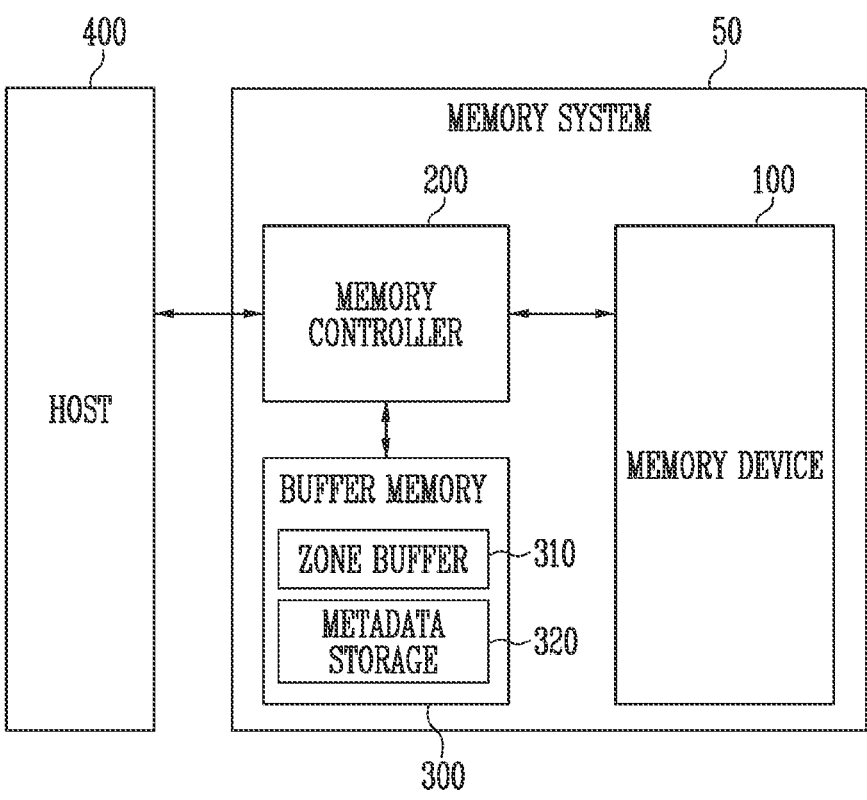
FIG. 1 is a diagram illustrating a memory system according to an embodiment of the present disclosure.

FIG. 1 is a diagram illustrating a memory system according to an embodiment of the present disclosure.

Referring to FIG. 1, a memory system 50 may include a memory device 100, a memory controller 200, and a buffer memory 300. The memory system 50 may be a device which stores data under the control of a host 400, such as a mobile phone, a smartphone, an MP3 player, a laptop computer, a desktop computer, a game console, a TV, a tablet PC, or an in-vehicle infotainment system.

The memory system 50 may be manufactured as any of various types of storage devices depending on a host interface that is a scheme for communication with the host 400. For example, the memory system 50 may be implemented as any of various types of storage devices, for example, a solid state drive (SSD), a multimedia card such as an MMC, an embedded MMC (eMMC), a reduced size MMC (RS-MMC), or a micro-MMC, a secure digital card such as an SD, a mini-SD, or a micro-SD, a universal serial bus (USB) storage device, a universal flash storage (UFS) device, a personal computer memory card international association (PCMCIA) card-type storage device, a peripheral component interconnection (PCI)-card type storage device, a PCI express (PCI-E) card-type storage device, a compact flash (CF) card, a smart media card, and a memory stick.

The memory system 50 may be manufactured in any one of various types of package forms. For example, the memory system 50 may be manufactured in any of various types of package forms, such as package on package (POP), system in package (SIP), system on chip (SOC), multi-chip package (MCP), chip on board (COB), wafer-level fabricated package (WFP), and wafer-level stack package (WSP).

The memory device 100 may store data. The memory device 100 may be operated under the control of the memory controller 200. The memory device 100 may include a memory cell array (not illustrated) including a plurality of memory cells which store data.

Each of the memory cells may be implemented as a single-level cell (SLC) capable of storing one bit of data, a multi-level cell (MLC) capable of storing two bits of data, a triple-level cell (TLC) capable of storing three bits of data, or a quad-level cell (QLC) capable of storing four bits of data.

The memory cell array (not illustrated) may include a plurality of memory blocks. Each memory block may include a plurality of memory cells. One memory block may include a plurality of pages. In an embodiment, a page may be the unit by which data is stored in the memory device 100 or the unit by which data stored in the memory device 100 is read. A memory block may be the unit by which data is erased.

In an embodiment, the memory device 100 may be implemented as a double data rate synchronous dynamic random access memory (DDR SDRAM), a low power double data rate fourth generation (LPDDR4) SDRAM, a graphics double data rate (GDDR) SDRAM, a low power DDR (LPDDR) SDRAM, a Rambus dynamic random access memory (RDRAM), a NAND flash memory, a vertical NAND flash memory, a NOR flash memory, a resistive RAM (RRAM), a phase-change RAM (PRAM), a magnetoresistive RAM (MRAM), a ferroelectric RAM (FRAM), or a spin transfer torque RAM (STT-RAM). For convenience of description, in the present specification, a description is made on that the memory device 100 is a NAND flash memory.

The memory device 100 may receive a command and an address from the memory controller 200, and may access the area of the memory cell array, selected by the address. The memory device 100 may perform an operation indicated by the command on the area selected by the address. For example, the memory device 100 may perform a write operation (i.e., a program operation), a read operation, and an erase operation. During a write operation, the memory device 100 may program data to the area selected by the address. During a read operation, the memory device 100 may read data from the area selected by the address. During an erase operation, the memory device 100 may erase data stored in the area selected by the address.

The memory controller 200 may control the overall operation of the memory system 50.

When power is applied to the memory system 50, the memory controller 200 may run firmware (FW). When the memory device 100 is a flash memory device, the firmware (FW) may include a host interface layer (HIL) which controls communication with the host 400, a flash translation layer (FTL) which controls communication between the host 400 and the memory device 100, and a flash interface layer (FIL) which controls communication with the memory device 100.

In an embodiment, the memory controller 200 may receive data and a logical block address (LBA) from the host 400, and may translate the logical block address (LBA) into a physical block address (PBA) indicating the address of memory cells which are included in the memory device 100 and in which data is to be stored. In the present specification, the terms "logical block address (LBA)" and "logical address" may be used interchangeably. In the present specification, the physical block address (PBA) and "physical address" may be used interchangeably.

The memory controller 200 may control the memory device 100 so that a write operation, a read operation or an erase operation is performed in response to a request received from the host 400. During a write operation, the memory controller 200 may provide a write command, a physical block address, and data to the memory device 100. During a read operation, the memory controller 200 may provide a read command and a physical block address to the memory device 100. During an erase operation, the memory controller 200 may provide an erase command and a physical block address to the memory device 100.

In an embodiment, the memory controller 200 may control two or more memory devices 100. In this case, the memory controller 200 may control the memory devices 100 depending on an interleaving scheme to improve operating performance. The interleaving scheme may be a scheme for controlling the memory devices 100 so that the operations of at least two memory devices 100 are caused to overlap each other.

The buffer memory 300 may temporarily store data provided from the host 400, or may temporarily store data read from the memory device 100. In an embodiment, the buffer memory 300 may be a volatile memory device. For example, the buffer memory 300 may be a dynamic random access memory (DRAM) or a static random access memory (SRAM).

In an embodiment, the buffer memory 300 may include a zone buffer 310 and a metadata storage 320. The zone buffer 310 may be a buffer to which a plurality of zones are allocated in response to a request from the host 400. The plurality of zones may respectively correspond to logical address groups provided by the host 400. The respective logical address groups may be logical address groups provided by different applications executed by the host 400. Here, each of the logical address groups may include consecutive logical addresses. The zone buffer 310 may temporarily store pieces of data corresponding to logical addresses included in each of the logical address groups.

In an embodiment, the plurality of zones corresponding to the logical address groups may be individually allocated to the zone buffer 310. A plurality of zone blocks included in the memory device 100 may be allocated to the plurality of zones, respectively. In an embodiment, the unit of a zone block may be a memory block. In an embodiment, the unit of a zone block may be a super block. The size of each zone may correspond to that of the corresponding zone block. The data temporarily stored in the zone buffer 310 may be stored in the zone blocks allocated to the plurality of zones, respectively.

In an embodiment, the metadata storage 320 may read metadata stored in the memory device 100, and may store the read metadata. The metadata may be data including information used to operate the memory system 50. For example, the metadata may include firmware to be run by the memory controller 200.

In an embodiment, the metadata may include map data indicating corresponding relationships between the physical addresses of the zones allocated to the zone buffer 310 and the zone blocks included in the memory device 100, and valid data information indicating whether data stored in the zone blocks is valid data. For example, the valid data information may be bitmap-format data indicating whether data stored in the zone blocks is valid on a certain size basis.

In other embodiments, the metadata may include information related to the zone blocks included in the memory device 100. The information related to the zone blocks may include read count information indicating the number of read operations performed on each zone block, erase count information indicating the number of erase operations performed on the zone block, information about the number of fail bits in data stored in the zone block, information about the time elapsed since data is stored in the zone block, information indicating whether a bad block is included in the zone block, and journal data information indicating changes in the map data.

In an embodiment, the memory controller 200 may control a data movement operation based on the map data and the information related to the zone blocks. The data movement operation may be an operation of storing data, stored in one of the plurality of zone blocks included in the memory device 100, in an additional zone block. The memory controller 200 may determine one zone block on which the data movement operation is to be performed, based on the information related to the zone blocks. The data movement operation may be an operation internally performed by the memory controller 200.

The additional zone block in which data stored in one zone block is to be stored, may be an open zone block. For example, the open zone block may be a zone block in which no data is stored.

In an embodiment, the memory controller 200 may internally generate a command, an address, and data regardless of whether a request from the host 400 is received, and may transmit them to the memory device 100. For example, the memory controller 200 may provide the memory device 100 with commands, addresses, and data required in order to perform read operations and write operations that are involved in performing wear leveling, read reclaim, garbage collection, etc. The wear leveling, read reclaim, garbage collection, etc. may be performed based on the information related to zone blocks.

In an embodiment, the memory controller 200 may update the map data after performing the data movement operation. After the data movement operation is terminated, the memory controller 200 may update map data corresponding to the physical address of one zone block so that the map data corresponds to the additional zone block. In detail, map data indicating a corresponding relationship between the physical address of one zone block and a zone may be updated to map data indicating a corresponding relationship between the physical address of an additional zone block and the zone.

In an embodiment, the memory controller 200 may read map data corresponding to the physical address of one zone block, among pieces of map data stored in the buffer memory 300, may change the read map data to map data corresponding to the physical address of an additional zone block, and may then provide the changed map data to the buffer memory 300.

The host 400 may communicate with the memory system 50 using at least one of various communication standards or interfaces such as universal serial bus (USB), Serial AT Attachment (SATA), serial attached SCSI (SAS), high speed interchip (HSIC), small computer system interface (SCSI), peripheral component interconnection (PCI), PCI express (PCIe), nonvolatile memory express (NVMe), universal flash storage (UFS), secure digital (SD), multimedia card (MMC), embedded MMC (eMMC), dual in-line memory module (DIMM), registered DIMM (RDIMM), and load reduced DIMM (LRDIMM) communication methods.

Figure 2:
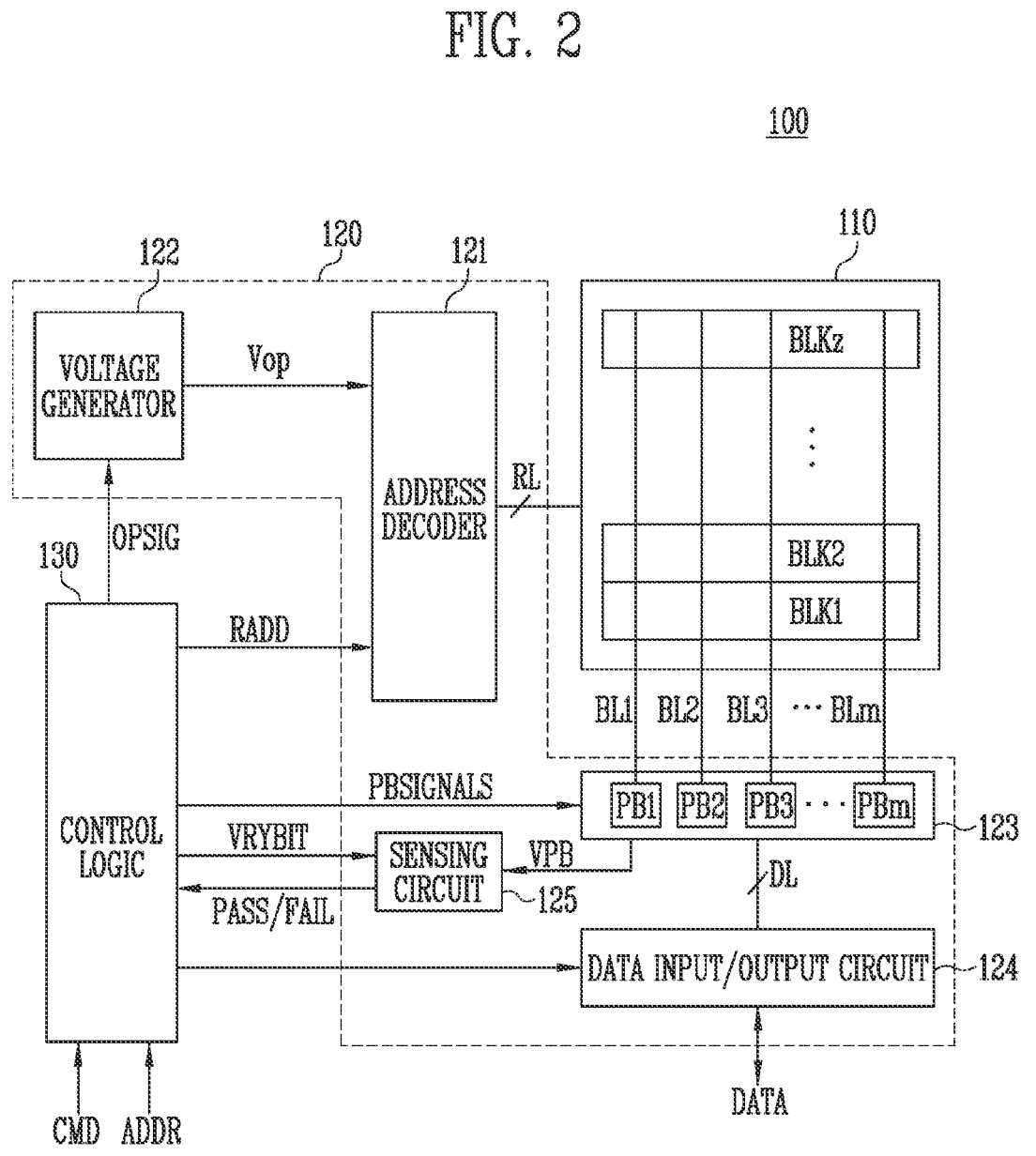

FIG. 2 is a diagram illustrating the structure of the memory device of FIG. 1 according to an embodiment of the present disclosure.

Referring to FIG. 2, the memory device 100 may include a memory cell array 110, a peripheral circuit 120, and a control logic 130.

The memory cell array 110 includes a plurality of memory blocks BLK1 to BLKz. The plurality of memory blocks BLK1 to BLKz may be coupled to an address decoder 121 through row lines RL. The memory blocks BLK1 to BLKz are coupled to a page buffer group 123 through bit lines BL1 to BLm. Each of the memory blocks BLK1 to BLKz may include a plurality of memory cells. In an embodiment, the plurality of memory cells may be nonvolatile memory cells. Memory cells coupled to the same word line among the plurality of memory cells are defined as one page. The memory cell array 110 may include a plurality of pages. In an embodiment of the present disclosure, each of the memory blocks BLK1 to BLKz included in the memory cell array 110 may include a plurality of dummy cells. For the dummy cells, one or more dummy cells may be coupled in series between a drain select transistor and memory cells and between a source select transistor and the memory cells.

Each of the memory cells of the memory device 100 may be implemented as a single-level cell (SLC) capable of storing one bit of data, a multi-level cell (MLC) capable of storing two bits of data, a triple-level cell (TLC) capable of storing three bits of data, or a quad-level cell (QLC) capable of storing four bits of data.

The peripheral circuit 120 may drive the memory cell array 110. In an example, the peripheral circuit 120 may drive the memory cell array 110 so that a program operation, a read operation, and an erase operation are performed under the control of the control logic 130. In an example, the peripheral circuit 120 may apply various operating voltages to the row lines RL and the bit lines BL1 to BLm or discharge the applied voltages under the control of the control logic 130.

The peripheral circuit 120 may include the address decoder 121, a voltage generator 122, the page buffer group 123, a data input/output circuit 124, and a sensing circuit 125.

The address decoder 121 is coupled to the memory cell array 110 through the row lines RL. The row lines RL may include drain select lines, word lines, source selection lines, and a common source line. In accordance with an embodiment of the present disclosure, the word lines may include normal word lines and dummy word lines. In accordance with an embodiment of the present disclosure, the row lines RL may further include a pipe select line.

The address decoder 121 may be operated under the control of the control logic 130. The address decoder 121 receives addresses ADDR from the control logic 130.

The address decoder 121 may decode a block address, among the received addresses ADDR. The address decoder 121 may select at least one of the memory blocks BLK1 to BLKz according to the decoded block address. The address decoder 121 may decode a row address RADD, among the received addresses ADDR. The address decoder 121 may select at least one word line WL of the selected memory block by applying voltages supplied from the voltage generator 122 to the at least one word line WL according to the decoded row address RADD.

During a program operation, the address decoder 121 may apply a program voltage to the selected word line and apply a pass voltage having a level lower than that of the program voltage to unselected word lines. During a program verify operation, the address decoder 121 may apply a verify voltage to the selected word line and apply a verify pass voltage having a level higher than that of the verify voltage to unselected word lines.

During a read operation, the address decoder 121 may apply a read voltage to the selected word line and apply a read pass voltage having a level higher than that of the read voltage to unselected word lines.

The erase operation of the memory device 100 is performed on a memory block basis. During the erase operation, the addresses ADDR input to the memory device 100 include a block address. The address decoder 121 may decode the block address and select one memory block according to the decoded block address. During the erase operation, the address decoder 121 may apply a ground voltage to word lines coupled to the selected memory block.

The address decoder 121 may decode a column address among the received addresses ADDR. The decoded column address may be transferred to the page buffer group 123. In an embodiment, the address decoder 121 may include components such as a row decoder, a column decoder, and an address buffer.

The voltage generator 122 may generate a plurality of operating voltages Vop using an external supply voltage that is supplied to the memory device 100. The voltage generator 122 may be operated under the control of the control logic 130.

In an embodiment, the voltage generator 122 may generate an internal supply voltage by regulating the external supply voltage. The internal supply voltage generated by the voltage generator 122 may be used as an operating voltage for the memory device 100.

In an embodiment, the voltage generator 122 may generate various operating voltages Vop that are used for program, read, and erase operations in response to an operation signal OPSIG. The voltage generator 122 may generate the plurality of operating voltages Vop using the external supply voltage or the internal supply voltage. The voltage generator 122 may generate various voltages required by the memory device 100. For example, the voltage generator 122 may generate a plurality of erase voltages, a plurality of program voltages, a plurality of pass voltages, a plurality of select read voltages, and a plurality of unselect read voltages.

The voltage generator 122 may include a plurality of pumping capacitors for receiving the internal supply voltage so as to generate a plurality of operating voltages Vop having various voltage levels, and may generate the plurality of operating voltages Vop by selectively enabling the plurality of pumping capacitors under the control of the control logic 130.

The generated operating voltages Vop may be supplied to the memory cell array 110 by the address decoder 121.

The page buffer group 123 includes first to m-th page buffers PB1 to PBm. The first to m-th page buffers PB1 to PBm are coupled to the memory cell array 110 through the first to m-th bit lines BL1 to BLm, respectively. The first to m-th page buffers PB1 to PBm are operated under the control of the control logic 130.

The first to m-th page buffers PB1 to PBm may transmit/receive data DATA to/from the data input/output circuit 124. During a program operation, the first to m-th page buffers PB1 to PBm receive data DATA to be stored through the data input/output circuit 124 and data lines DL.

During a program operation, the first to m-th page buffers PB1 to PBm may transfer the data DATA to be stored, received through the data input/output circuit 124, to selected memory cells through the bit lines BL1 to BLm when a program pulse is applied to a selected word line. The memory cells in a selected page are programmed based on the received data DATA. Memory cells coupled to a bit line to which a program enable voltage (e.g., a ground voltage) is applied may have increased threshold voltages. The threshold voltages of memory cells coupled to a bit line to which a program-inhibit voltage (e.g., a supply voltage) is applied may be maintained. During a program verify operation, the first to m-th page buffers PB1 to PBm may read the data DATA stored in the selected memory cells from the selected memory cells through the bit lines BL1 to BLm.

During a read operation, the page buffer group 123 may read data DATA from the memory cells in the selected page through the bit lines BL1 to BLm, and may store the read data DATA in the first to m-th page buffers PB1 to PBm.

During an erase operation, the page buffer group 123 may allow the bit lines BL1 to BLm to float. In an embodiment, the page buffer group 123 may include a column select circuit.

In an embodiment, while pieces of data stored in some of the plurality of page buffers included in the page buffer group 123 are being programmed to the memory cell array 110, the remaining page buffers May receive new data from the memory controller 200 and then store the new data.

The data input/output circuit 124 is coupled to the first to m-th page buffers PB1 to PBm through the data lines DL. The data input/output circuit 124 is operated under the control of the control logic 130.

The data input/output circuit 124 may include a plurality of input/output buffers (not illustrated) which receive input data DATA. During a program operation, the data input/output circuit 124 receives the data DATA to be stored from an external controller (not illustrated). During a read operation, the data input/output circuit 124 outputs the data DATA, received from the first to m-th page buffers PB1 to PBm included in the page buffer group 123, to the external controller.

During a read operation or a verify operation, the sensing circuit 125 may generate a reference current in response to an enable bit signal VRYBIT generated by the control logic 130, and may output a pass signal or a fail signal to the control logic 130 by comparing a sensing voltage VPB received from the page buffer group 123 with a reference voltage generated by the reference current. In an example, the sensing circuit 125 may output a pass signal to the control logic 130 when the magnitude of the sensing voltage VPB is less than that of the reference voltage. In an example, the sensing circuit 125 may output a fail signal to the control logic 130 when the magnitude of the sensing voltage VPB is less-larger than that of the reference voltage.

The control logic 130 may be coupled to the address decoder 121, the voltage generator 122, the page buffer group 123, the data input/output circuit 124, and the sensing circuit 125. The control logic 130 may control the overall operation of the memory device 100. The control logic 130 may be operated in response to a command CMD transferred from an external device.

The control logic 130 may control the peripheral circuit 120 by generating various types of signals in response to the command CMD and addresses ADDR. For example, the control logic 130 may generate an operation signal OPSIG, the row address RADD, page buffer control signals PBSIGNALS, and the enable bit VRYBIT in response to the command CMD and the addresses ADDR. The control logic 130 may output the operation signal OPSIG to the voltage generator 122, may output the row address RADD to the address decoder 121, may output the page buffer control signals PBSIGNALS to the page buffer group 123, and may output the enable bit VRYBIT to the sensing circuit 125. In addition, the control logic 130 may determine whether a verify operation has passed or failed in response to the pass or fail signal PASS or FAIL output from the sensing circuit 125.

Figure 3:
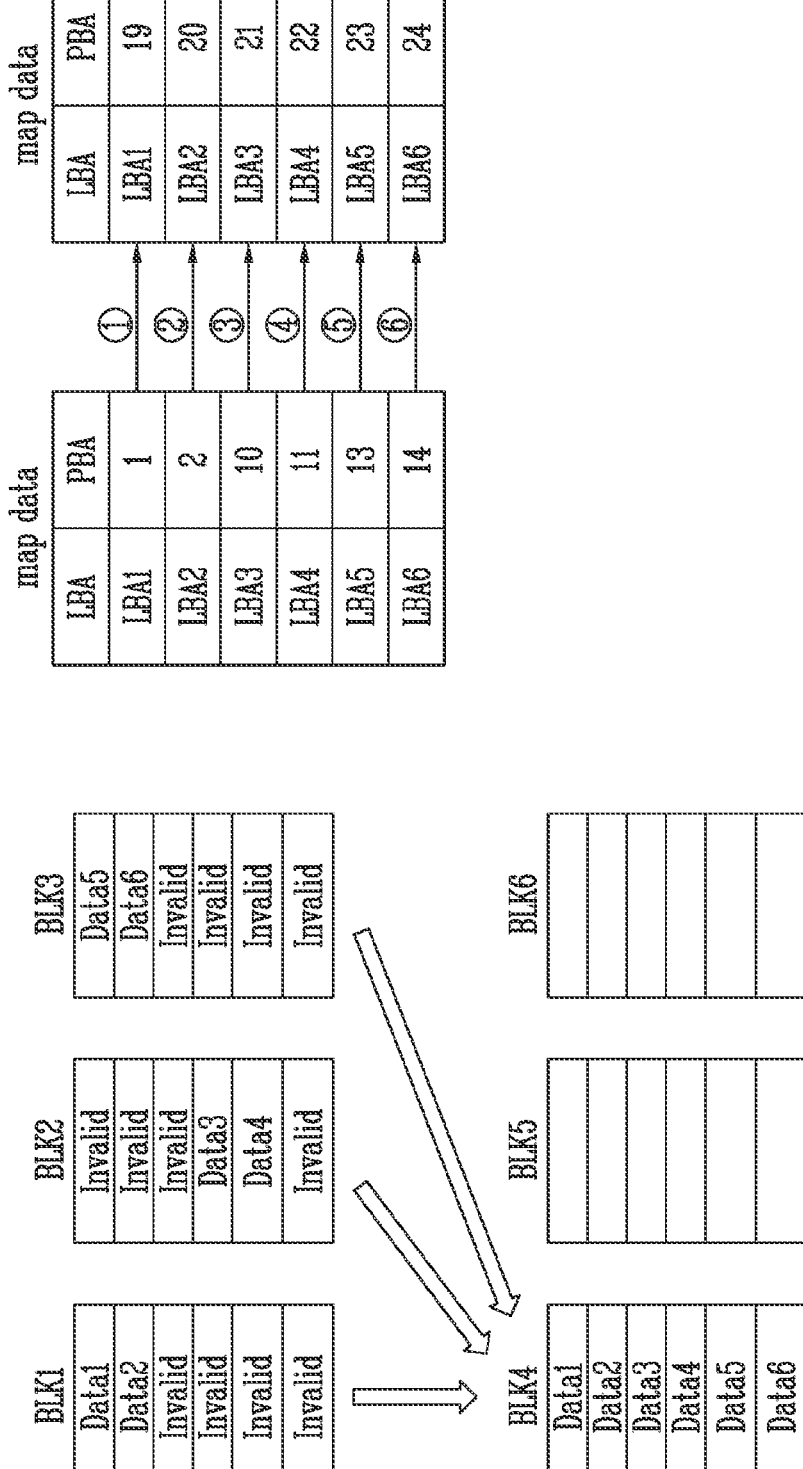
FIG. 3 is a diagram illustrating an operation of updating map data in page-based mapping according to an embodiment of the present disclosure.

FIG. 3 is a diagram illustrating an operation of updating map data in page-based mapping according to an embodiment of the present disclosure.

Referring to FIG. 3, each of first data to sixth data Data1 to Data6 may be data stored in one page included in a memory block.

In FIG. 3, a description will be made on that the first data to sixth data Data1 to Data6 stored in first to third memory blocks BLK1 to BLK3 are moved to a fourth memory block BLK4. Further, a description will be made based on the case where the first data to sixth data Data1 to Data6 correspond to first to sixth logical addresses LBA1 to LBA6, respectively.

First, before the first data to sixth data Data1 to Data6 are moved, a first logical address LBA1 may correspond to a first physical address PBA1, a second logical address LBA2 may correspond to a second physical address PBA2, a third logical address LBA3 may correspond to a tenth physical address PBA10, a fourth logical address LBA4 may correspond to an eleventh physical address PBA11, a fifth logical address LBA5 may correspond to a thirteenth physical address PBA13, and a sixth logical address LBA6 may correspond to a fourteenth physical address PBA14.

When the first data to sixth data Data1 to Data6 are moved to the fourth memory block BLK4, the first data Data1 may be first stored in the fourth memory block BLK4, and thereafter the first physical address PBA1 corresponding to the first logical address LBA1 may be updated to a nineteenth physical address PBA19 (①). Further, after the second data Data2 is stored in the fourth memory block BLK4, the second physical address PBA2 corresponding to the second logical address LBA2 may be updated to a twentieth physical address PBA20 (②). Furthermore, after the third data Data3 is stored in the fourth memory block BLK4, the tenth physical address PBA10 corresponding to the third logical address LBA3 may be updated to a 21-st physical address PBA21 (③). Further, after the fourth data Data4 is stored in the fourth memory block BLK4, the eleventh physical address PBA11 corresponding to the fourth logical address LBA4 may be updated to a 22-nd physical address PBA22 (④). Further, after the fifth data Data5 is stored in the fourth memory block BLK4, the thirteenth physical address PBA13 corresponding to the fifth logical address LBA5 may be updated to a 23-rd physical address PBA23 (⑤). In addition, after the sixth data Data6 is stored in the fourth memory block BLK4, when the fourteenth physical address PBA14 corresponding to the sixth logical address LBA6 is updated to the 24-th physical address PBA24 (⑥), data movement for the first data to sixth data Data1 to Data6 may be terminated.

That is, in page-based mapping, when data corresponding to one page is moved, one map update occurs, and thus map updates may frequently occur. Time is required to update map data whenever data corresponding to each page is moved, and thus the speed at which data is moved may be decreased.

Figure 4:
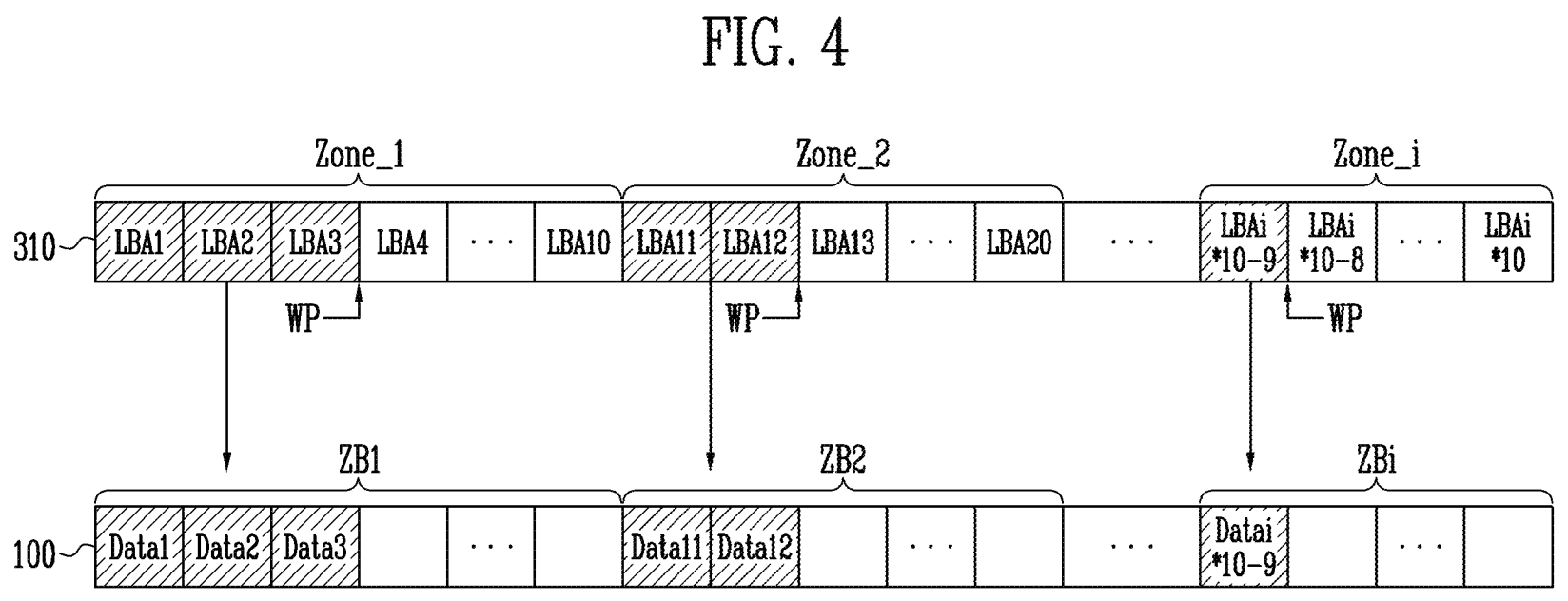

FIG. 4 is a diagram illustrating a memory device including a plurality of zones allocated to a zone buffer and a plurality of zone blocks allocated to respectively correspond to the plurality of zones according to an embodiment of the present disclosure.

Referring to FIG. 4, a plurality of zones may be allocated to a zone buffer 310. The memory device 100 may include a plurality of zone blocks. The plurality of zones may include first to i-th zones Zone_1 to Zone_i. The plurality of zones may correspond to a plurality of logical address groups, respectively. In an embodiment, each of the plurality of zones may be an area allocated to the zone buffer 310 by the size of each of the logical address groups. In an embodiment, the plurality of zones may be areas in which pieces of data respectively corresponding to logical address groups are stored. Here, logical addresses included in each of the logical address groups may be consecutive logical addresses. In FIG. 4, a description is made based on the case where one logical address group includes 10 logical addresses by way of example.

The first zone Zone_1 may correspond to a first logical address group. The first logical address group may include first to tenth logical addresses LBA1 to LBA10. The second zone Zone_2 may correspond to a second logical address group. The second logical address group may include eleventh to twentieth logical addresses LBA11 to LBA20. The i-th zone Zone_i may correspond to an i-th logical address group. The i-th logical address group may include $i*10-9$-th to $i*10$-th logical addresses LBA $i*10-9$ to LBA $i*10$.

A first zone block ZB1 may be allocated to the first zone Zone_1. The zone buffer 310 may receive pieces of data corresponding to the first to third logical addresses LBA1 to LBA3 from the host, and may store the data in the first zone Zone_1. Thereafter, the first data to third data Data1 to Data3 corresponding to the first to third logical addresses LBA1 to LBA3 may be stored in the first zone block ZB1 allocated to the first zone Zone_1. A write pointer WP may indicate the location of data corresponding to logical addresses is-stored last in the zone block. Because data ranging to the third data Data3 corresponding to the third logical address LBA3 is stored in the first zone block ZB1 allocated to the first zone Zone_1, the write pointer WP of the first zone Zone_1 may indicate the third logical address LBA3. In an embodiment, the write pointer offset of the first zone Zone_1 may be 3.

A second zone block ZB2 may be allocated to the second zone Zone_2. The zone buffer 310 may receive data corresponding to the eleventh and twelfth logical addresses LBA11 and LBA12 from the host, and may store the received data in the second zone Zone_2. Thereafter, the eleventh and twelfth data Data11 and Data12 corresponding to the eleventh and twelfth logical addresses LBA11 and LBA12 may be stored in the second zone block ZB2 allocated to the second zone Zone_2. The write pointer WP of the second zone Zone_2 may indicate the twelfth logical address LBA12. In an embodiment, the write pointer offset of the second zone Zone_2 may be 2.

An i-th zone block ZBi may be allocated to the i-th zone Zone_i. The zone buffer 310 may receive data corresponding to the i-19-th logical address LBAi-19 from the host, and may store the received data in the i-th zone Zone_i. Thereafter, the i-19-th data Datai-19 corresponding to the i-19-th logical address LBAi-19 may be stored in the i-th zone block ZBi allocated to the i-th zone Zone_i. The write pointer WP of the i-th zone Zone_i may indicate the i-19-th logical address LBAi-19.

Figures 5, 6:
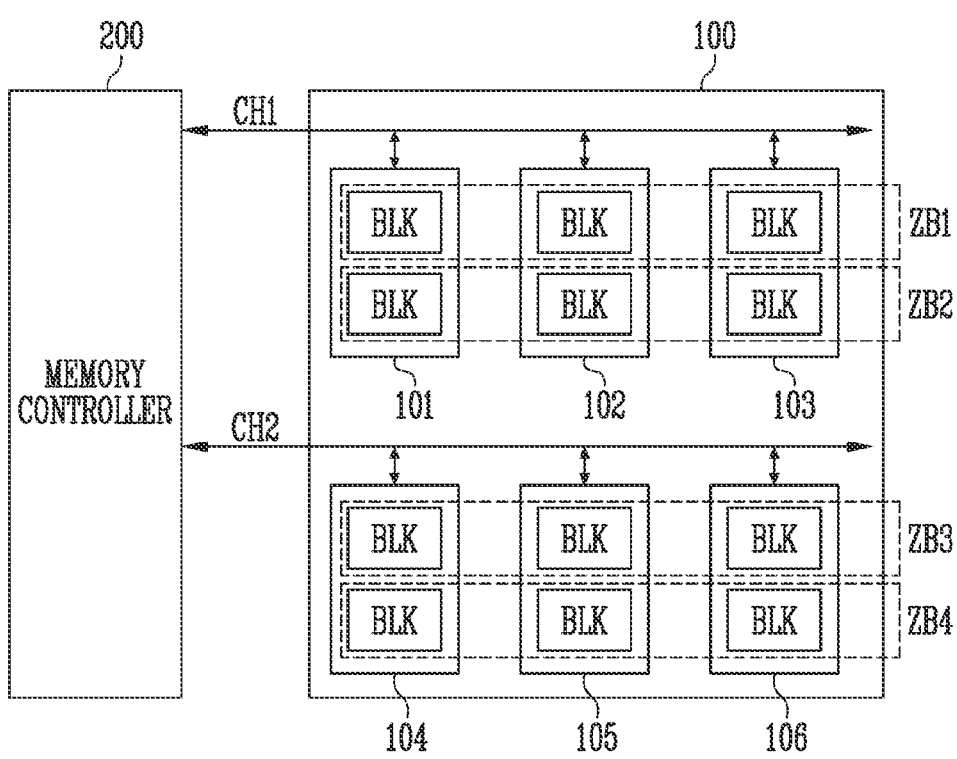
FIG. 5 is a diagram illustrating a connection relationship between a memory controller and a memory device according to an embodiment of the present disclosure.
FIG. 6 is a diagram illustrating information related to zone blocks according to an embodiment of the present disclosure.

FIG. 5 is a diagram illustrating a connection relationship between a memory controller and a memory device according to an embodiment of the present disclosure.

Referring to FIG. 5, the memory device 100 illustrated in FIG. 1 may include a plurality of memory devices 101 to 106. Each of the plurality of memory devices 101 to 106 may include a plurality of memory blocks. In FIG. 5, for convenience of description, the case in which each of the plurality of memory devices 101 to 106 includes two memory blocks is described by way of example. The memory controller 200 may be coupled to the plurality of memory devices 101 to 106 through first and second channels CH1 and CH2. In an embodiment, the number of channels or the number of memory devices coupled to each of the channels may be changed in various forms without being limited to that illustrated in FIG. 5.

The first to third memory devices 101 to 103 may be coupled in common to the first channel CH1. The first to third memory devices 101 to 103 may communicate with the memory controller 200 through the first channel CH1. While any of the first to third memory devices 101 to 103 is communicating with the memory controller 200 through the first channel CH1, other memory devices may not communicate with the memory controller 200. For example, communication between the first to third memory devices 101 to 103 and the memory controller 200 may be a data input/output operation.

However, each of the first to third memory devices 101 to 103 may internally perform an operation corresponding to a command received from the memory controller. For example, the operation corresponding to the command received from the memory controller may be a program operation, a read operation, or an erase operation.

The fourth to sixth memory devices 104 to 106 coupled to the second channel CH2 may be operated in the same manner as the first to third memory devices 101 to 103 coupled to the above-described first channel CH1.

The memory system 50 composed of the plurality of memory devices may perform operations using an interleaving scheme. The interleaving scheme may be a scheme which performs an operation of reading data from each of a plurality of memory devices or storing data therein in a structure in which the plurality of memory devices share a single channel with each other. In an embodiment, the memory controller 200 may distribute and allocate pieces of data corresponding to consecutive logical addresses to a plurality of memory devices, respectively.

In an embodiment, the memory controller 200 may transmit a command, an address, and data to the first memory device 101 through the first channel CH1. The memory controller 200 may transmit a command, an address, and data to the second memory device 102 while the first memory device 101 receives data and performs a program operation.

In an embodiment, the memory controller 200 may allocate zone blocks to a plurality of zones, respectively. The memory controller 200 may configure each zone block using one or more memory blocks included in the plurality of memory devices, respectively. In an embodiment, the first zone block ZB1 may be a zone block allocated to the first zone Zone_1 illustrated in FIG. 4. In an example, one or more memory blocks included in the first to third memory devices 101 to 103 may form the first zone block ZB1. In an example, one or more memory blocks included in the fourth to sixth memory devices 104 to 106 may form the third zone block ZB3.

The memory controller 200 may store data and read stored data on a zone block basis. In an embodiment, each zone block may be a super block. In an embodiment, one zone block may have one physical address.

In an embodiment, each zone block may be composed of one or more memory blocks included in a plurality of memory devices coupled to different channels. For example, a zone block may be composed of one or more memory blocks included in the first memory device 101 and the fourth memory device 104.

FIG. 6 is a diagram illustrating information related to zone blocks according to an embodiment of the present disclosure.

Referring to FIG. 6, the metadata storage 320 illustrated in FIG. 1 may store information related to zone blocks. The information related to zone blocks may be read from the memory device 100, and may be stored in the metadata storage 320. The information related to zone blocks may include erase count information (erase cnt), read count information (read cnt), information about the number of fail bits (num fb), and information about bad blocks (bb_inf).

The memory system 50 may perform a data movement operation based on the information related to zone blocks. In an embodiment, the memory system 50 may determine a zone block having an erase count value exceeding a first threshold value, among a plurality of zone blocks, to be one zone block on which a data movement operation is to be performed. For example, when the first threshold value is 15, the memory system 50 may determine the first zone block ZB1 to be one zone block on which the data movement operation is to be performed because the erase count value of the first zone block ZB1 is 20. Also, the memory system 50 may store data, stored in the one zone block, in an additional zone block that is not allocated to the plurality of zones.

In an embodiment, the memory system 50 may determine a zone block having a read count value exceeding a second threshold value, among a plurality of zone blocks, to be one zone block on which a data movement operation is to be performed. For example, when the second threshold value is 22, the memory system 50 may determine the third zone block ZB3 to be one zone block on which the data movement operation is to be performed because the read count value of the third zone block ZB3 is 25.

In an embodiment, the memory system 50 may determine a zone block having the number of fail bits exceeding a third threshold value, among the plurality of zone blocks, to be one zone block on which a data movement operation is to be performed. For example, when the third threshold value is 35, the memory system 50 may determine the second zone block ZB2 to be one zone block on which the data movement operation is to be performed because the number of fail bits in the second zone block ZB2 is 40.

The metadata storage 320 may include information about a bad block for each of the plurality of zone blocks. The one zone block may be a bad block on which a program operation, a read operation or an erase operation cannot be performed any more. Here, the information about a bad block for the one zone block may be updated. In an embodiment, a logic value of 0 may be a value indicating that the corresponding zone block is a normal block. In an embodiment, a logic value of 1 may be a value indicating that the corresponding zone block is a bad block. The one zone block that is the bad block may be determined to be the zone block on which a data movement operation is to be performed.

FIG. 7 is a diagram illustrating a data movement operation and a map update operation of a memory system according to an embodiment of the present disclosure.

In FIG. 7, a description will be made with reference to FIG. 4. Referring to FIG. 7, first to i-th zone blocks ZB1 to ZBi may be zone blocks respectively allocated to first to i-th zones Zone_1 to Zone_i. In an embodiment, the first zone block ZB1 may be a zone block allocated to the first zone Zone_1, and p–1-th to n-th zone blocks ZBp–1 to ZBn may be zone blocks that are not allocated to the plurality of zones. In an embodiment, the p–1-th to n-th zone blocks ZBp–1 to ZBn may be open zone blocks in which data is not stored.

The memory system 50 may determine one zone block on which a data movement operation is to be performed, based on the information related to the plurality of zone blocks. For example, the memory system 50 may determine one zone block on which a data movement operation is to be performed to be the first zone block ZB1 based on the information related to the plurality of zone blocks. The memory system 50 may select an additional zone block in which data stored in the one zone block is to be stored. For example, the memory system 50 may select the p-th zone block ZBp as the additional zone block in which data stored in the first zone block ZB1 is to be stored. Thereafter, the memory system 50 may perform a data movement operation of storing the data, stored in the first zone block ZB1, in the p-th zone block ZBp. The memory system 50 may perform the data movement operation based on a write pointer indicating the location of data stored last in the zone block. For example, because the write pointer offset of the first zone block is 3, first data to third data Data1 to Data3 stored in the first zone block ZB1 may be stored in the p-th zone block ZBp.

The first data to third data Data1 to Data3 stored in the first zone block ZB1 may include valid data and invalid data. That is, the valid data and the invalid data stored in the first zone block ZB1 may be stored in the p-th zone block ZBp.

After storing the data stored in the first zone block ZB1, in the p-th zone block ZBp, the memory system 50 may update the map data. The map data may be data indicating corresponding relationships between the plurality of zones and the physical addresses of the plurality of zone blocks. For example, one zone may correspond to one zone block. In an embodiment, one zone block may have one physical address. In an embodiment, the map data may include information about respective write pointer offsets of the plurality of zones. Before the data movement operation is performed on the first zone block ZB1, the physical address of a zone block corresponding to the first zone Zone_1 may be the physical address of first zone block ZB1. When the data movement operation performed on the first zone block ZB1 is terminated, the physical address of the first zone block ZB1 corresponding to the first zone Zone_1 may be updated to the physical address of the p-th zone block ZBp. Thereafter, the memory system 50 may update data stored in the first zone block ZB1 to invalid data. As described above with reference to the first zone block by way of example, data movement operations on the remaining zone blocks may be performed in the same manner as the first zone block. In detail, when a data movement operation of storing data stored in one zone block, in an additional zone block is terminated, the memory system 50 may update the physical address of the zone block allocated to one zone to the physical address of the additional zone block.

The memory system 50 may move data in units of a zone block allocated to each zone, and may update map data in units of a zone. After the data movement operation is terminated, the memory system 50 may update the physical address of a zone block corresponding to each zone. Since the number of times that map data is updated may be decreased in the zone-based mapping scheme, the speed at which data stored in one zone block is stored in an additional zone block may be improved.

Figure 8:
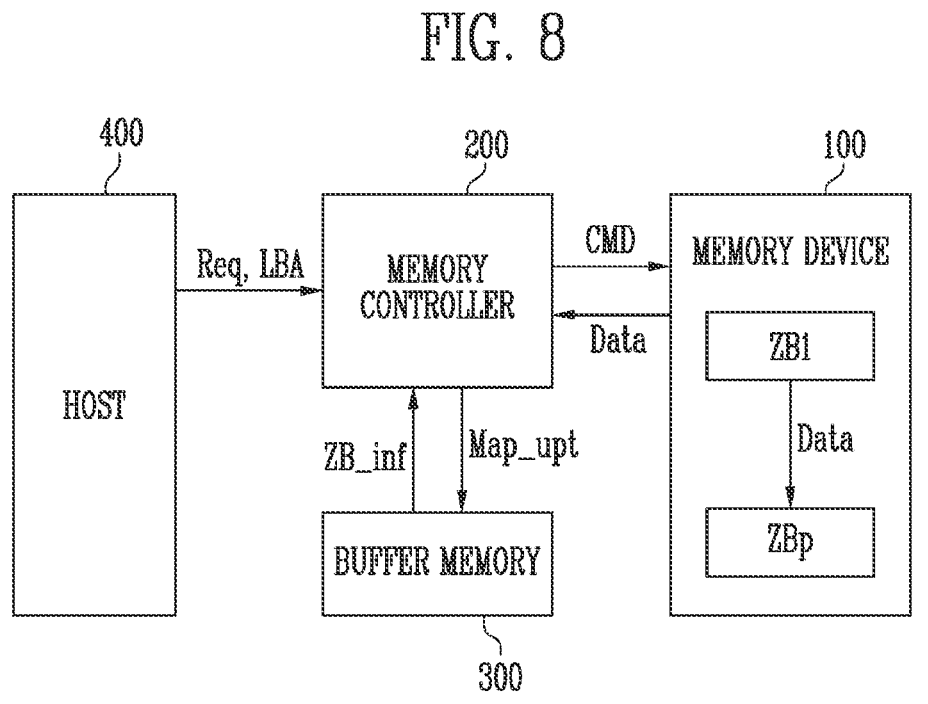

FIG. 8 is a diagram illustrating a data movement operation of a memory system according to an embodiment of the present disclosure.

Referring to FIG. 8, a memory controller 200 may be provided with information ZB_inf related to zone blocks from a buffer memory 300. The memory controller 200 may control a data movement operation of storing data, stored in a first zone block ZB1, in a p-th zone block ZBp based on the information ZB_inf related to zone blocks. The first zone block ZB1 included in the memory device 100 may be a zone block allocated to a first zone. The p-th zone block ZBp may be an open zone block.

After the data movement operation is terminated, the memory controller 200 may update the physical address of the first zone block corresponding to the first zone to the physical address of the p-th zone block. Thereafter, the memory controller may provide the updated map data Map_upt of the first zone to the buffer memory 300. The buffer memory 300 may store the updated map data Map_upt of the first zone in a metadata storage included in the buffer memory 300.

The memory controller 200 may receive a request Req from the host 400 while the data movement operation is being performed. In an embodiment, when a read request is received while the data movement operation is being performed, the memory controller 200 may read data from the first zone block ZB1 and provide the read data to the host 400 because the map data is not yet updated. The memory device 100 may perform in parallel an operation of providing the data stored in the first zone block ZB1 to the memory controller 200, and an operation storing the data, stored in the first zone block ZB1, in the p-th zone block ZBp. In an embodiment, when a read request is received after the data movement operation is terminated, the memory controller 200 may read data from the p-th zone block ZBp and provide the read data to the host 400 because the map data has been updated.

In an embodiment, when a write request is received from the host 400 while the data movement operation is being performed, the memory controller 200 may make the write request wait. When the data movement operation is terminated, the memory controller 200 may control the memory device 100 to store data corresponding to the write request in the p-th zone block ZBp.

In an embodiment, the memory controller 200 may receive zone management requests from the host 400. Each of the zone management requests may be a request for allowing the host 400 to check or change the state of the corresponding zone. In an embodiment, when the zone management requests are received from the host 400, the memory controller 200 may perform operations corresponding to the zone management requests after the data movement operation is terminated. For example, the zone management requests performed after the data movement operation is terminated may include a zone open request, a zone close request, a zone finish request, and a zone read-only request. The zone open request may be a request for instructing allocation of a new zone. The zone close request may be a request for deactivating the state of a zone. The zone finish request may be a request for converting the state of one zone into the state of a full zone. In a zone block allocated to the full zone, data may be no longer stored. The zone read-only request may be a request for converting the state of one zone allocated to the buffer memory 300 into the state of a read-only zone. In the zone block allocated to the read-only zone, data may be no longer stored, and only reading of stored data may be possible. In an embodiment, when the zone management request received from the host 400 is a zone open request, a zone close request, or a zone read-only request, the memory controller 200 may not suspend the data movement operation.

Moreover, when the zone reset request, among the zone management requests, is received from the host 400, the memory controller 200 may suspend the data movement operation. The zone reset request may be a request for initializing the state of the corresponding zone. For example, when the zone reset request for the first zone is received, the memory controller 200 may release an area allocated as the first zone from the buffer memory 300. Accordingly, the memory controller 200 may control the memory device 100 to erase the data stored in the first zone block ZB1 allocated to the first zone. When the data movement operation is suspended, the memory controller 200 may update the data stored in the p-th zone block ZBp to invalid data.

Moreover, when a zone offline request, among the zone management requests, is received from the host 400, the memory controller 200 may suspend the data movement operation. The zone offline request may be a request for changing the state of the corresponding zone into an unavailable state in which the corresponding zone is no longer used. For example, a zone that is the target of the zone offline request may be a zone, the lifespan of which has expired. For example, when the zone offline request for the first zone is received, the memory controller 200 may not store data any more in the first zone block ZB1 allocated to the first zone. When the zone offline request is received from the host, the memory controller 200 may suspend a data movement operation, and may update the data stored in the p-th zone block ZBp to invalid data.

In an embodiment, when a sudden power-off occurs while a data movement operation is being performed, the memory controller 200 may suspend the data movement operation. Such a sudden power-off may be a situation in which the main power supplied to the memory system 50 is suddenly interrupted. In response to the sudden power-off, the memory controller 200 may suspend the data movement operation, and may update the data stored in the p-th zone block ZBp to invalid data. Thereafter, the memory controller 200 may perform a power-off operation during the time in which auxiliary power is supplied. The power-off operation may include a dump operation of storing data, stored in the buffer memory 300, in the 10) memory device 100. Thereafter, when power is turned on, the memory controller 200 may control the memory device 100 to resume the data movement operation of storing the data, stored in the first zone block ZB1, in the p-th zone block ZBp.

FIG. 9 is a flowchart for describing the data movement operation of the memory system according to an embodiment of the present disclosure.

Referring to FIG. 9, at operation S901, the memory system 50 may determine a zone block allocated to one zone on which a data movement operation is to be performed, based on information related to a plurality of zone blocks. In an embodiment, an erase count value for the zone block allocated to one zone may exceed a first threshold value. In an embodiment, a read count value for the zone block allocated to one zone may exceed a second threshold value. In an embodiment, the number of fail bits in the zone block allocated to the one zone may exceed a third threshold value. In an embodiment, the time elapsed since data is stored in the zone block allocated to one zone may exceed a preset time. In an embodiment, the zone block allocated to one zone may be a bad block.

At operation S903, the memory system 50 may perform a data movement operation of storing data, stored in the zone block allocated to the zone, in an additional zone block. The additional zone block may be an open zone block.

At operation S905, after the data movement operation is terminated, the memory system 50 may update the physical address of the zone block allocated to the one zone to the physical address of the additional zone block. In an embodiment, the memory system 50 may store map data in the updated zone in the buffer memory 300.

Figure 10:
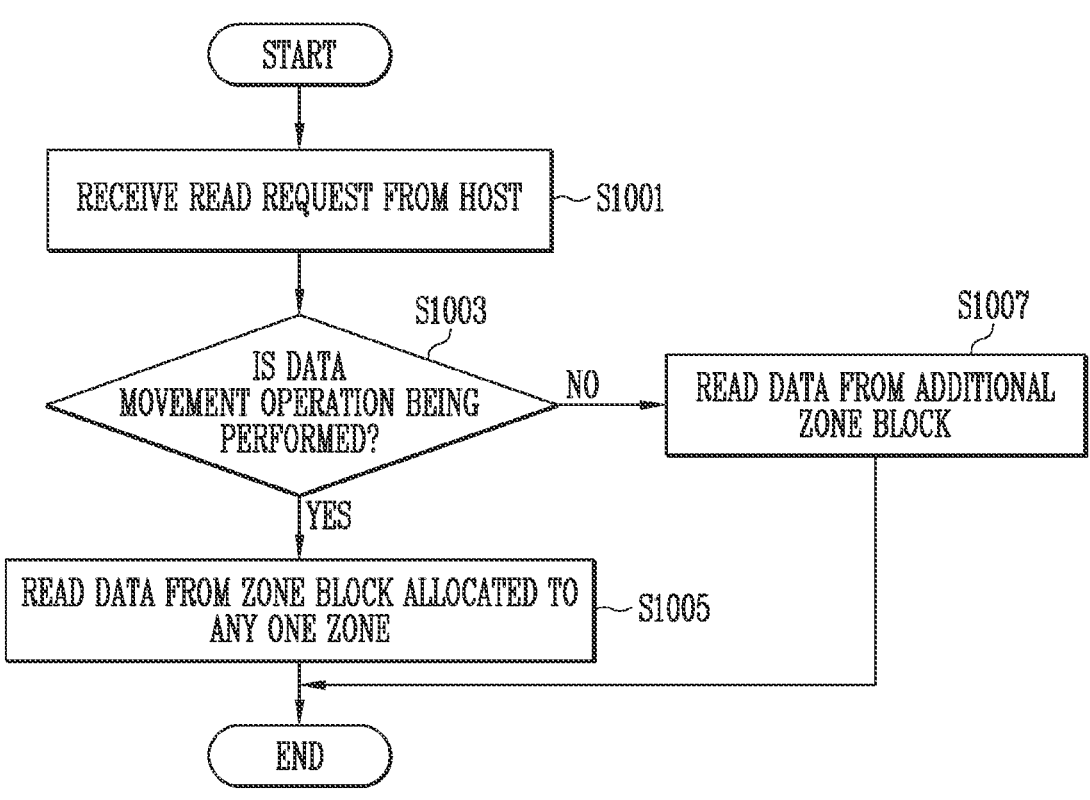
FIG. 10 is a flowchart for describing a data movement operation of a memory system corresponding to a read request from a host according to an embodiment of the present disclosure.

FIG. 10 is a flowchart for describing the data movement operation of the memory system corresponding to a read request from a host according to an embodiment of the present disclosure.

In an embodiment, the flowchart of FIG. 10 is obtained by implementing operation S903 of FIG. 9 in detail.

Referring to FIG. 10, at operation S1001, the memory system 50 receive a read request from the host 400.

At operation S1003, the memory system 50 may determine whether a data movement operation is being performed. When the read request is received while the data movement operation is being performed, operation S1005 may be performed. On the other hand, when the read request is received while a data movement operation is not performed, operation S1007 may be performed.

At operation S1005, the memory system 50 may read data from the zone block allocated to the one zone. In an embodiment, the zone block allocated to the one zone may be the first zone block illustrated in FIG. 8. In an embodiment, the memory system 50 may provide data stored in the zone block allocated to the one zone to the host while the data stored in the zone block allocated to the one zone is being stored in an additional zone block.

At operation S1007, when the read request is received from the host while the data movement operation is not performed, the memory system 50 may read data from the additional zone block.

Figure 11:
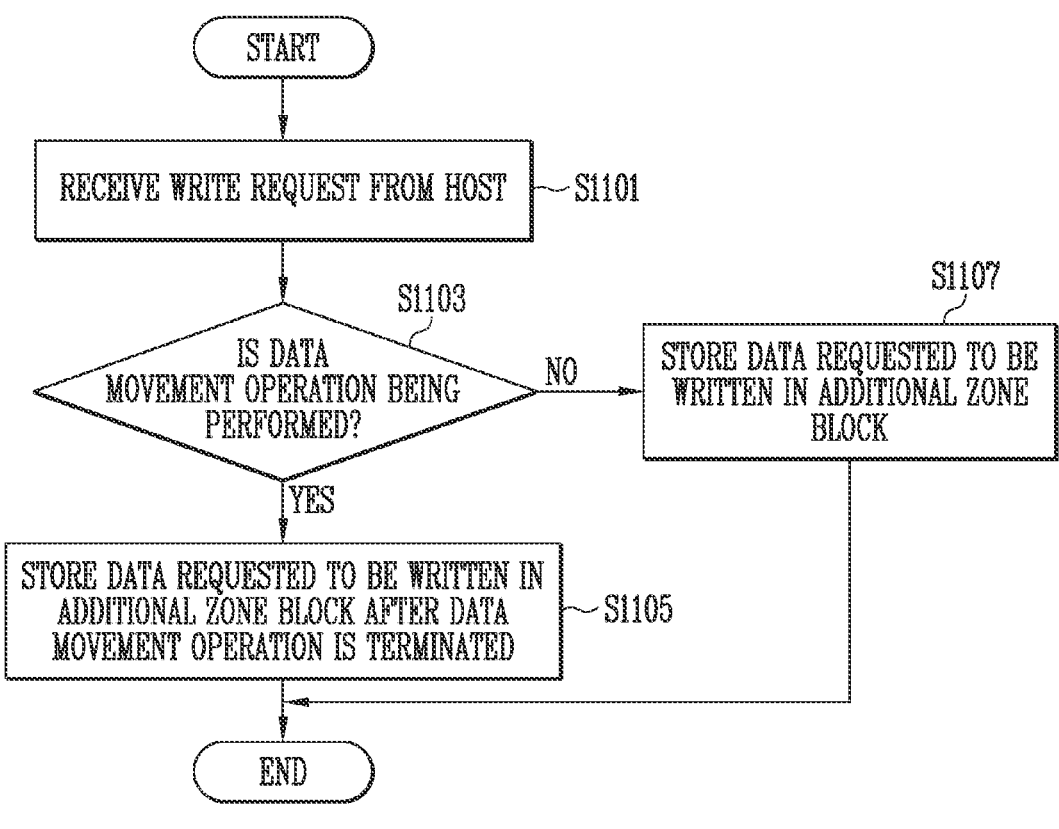
FIG. 11 is a flowchart for describing a data movement operation of a memory system corresponding to a write request from a host according to an embodiment of the present disclosure.

FIG. 11 is a flowchart for describing the data movement operation of the memory system corresponding to a write request from a host according to an embodiment of the present disclosure.

In an embodiment, the flowchart of FIG. 11 is obtained by implementing operation S903 of FIG. 9 in detail.

Referring to FIG. 11, at operation S1101, the memory system 50 receive a write request from the host.

At operation S1103, the memory system 50 may determine whether a data movement operation is being performed. When the write request is received while the data movement operation is being performed, operation S1105 may be performed. On the other hand, when the write request is received while a data movement operation is not performed, operation S1107 may be performed.

At operation S1105, the memory system 50 may store data corresponding to the write request to an additional zone block after the data movement operation is terminated. The write request from the host may wait until the data movement operation is terminated.

At operation S1107, the memory system 50 may store data requested to be written in the additional zone block.

Figure 12:
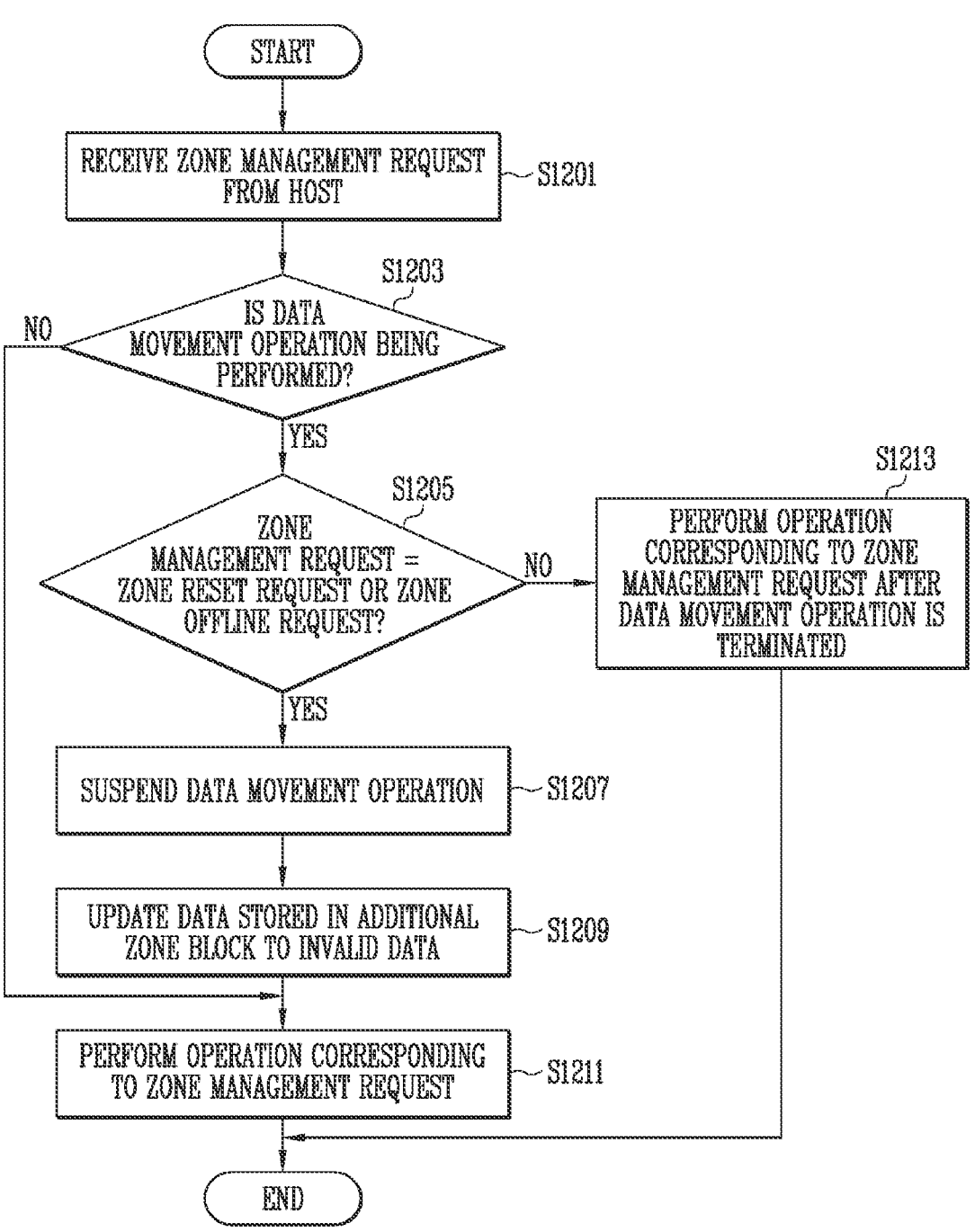
FIG. 12 is a flowchart for describing a data movement operation of a memory system corresponding to a zone management request from a host according to an embodiment of the present disclosure.

FIG. 12 is a flowchart for describing the data movement operation of the memory system corresponding to a zone management request from a host according to an embodiment of the present disclosure.

In an embodiment, the flowchart of FIG. 12 is obtained by embodying operation S903 of FIG. 9.

Referring to FIG. 12, at operation S1201, the memory system 50 receive a zone management request from the host.

At operation S1203, the memory system 50 may determine whether a data movement operation is being performed. When the zone management request is received while the data movement operation is being performed, operation S1205 may be performed. On the other hand, when the zone management request is received while a data movement operation is not performed, operation S1211 may be performed.

At operation S1205, the memory system 50 may determine whether the zone management request received from the host while the data movement operation is being performed is a zone reset request or a zone offline request. When the zone management request is the zone reset request or the zone offline request, operation S1207 may be performed. On the other hand, when the zone management request is not a zone reset request or a zone offline request, operation S1213 may be performed.

At operation S1207, when the zone management request received from the host is the zone reset request or the zone offline request, the memory system 50 may suspend the data movement operation.

At operation S1209, the memory system 50 may update the data stored in an additional zone block to invalid data.

At operation S1211, the memory system 50 may perform an operation corresponding to the zone management request. In an embodiment, when the zone reset request is received from the host, the memory system 50 may suspend the data movement operation, and may erase data stored in the zone block allocated to one zone. In an embodiment, when the zone offline request is received from the host, the memory system 50 may suspend the data movement operation, and may change the state of one zone to an unavailable state.

At operation S1213, when the zone management request received from the host is not a zone reset request or a zone offline request, the memory system 50 may perform an operation corresponding to the zone management request after the data movement operation is terminated. In an embodiment, the zone management request performed after the data movement operation is terminated may include a zone open request, a zone close request, a zone finish request, and a zone read-only request.

Figure 13:
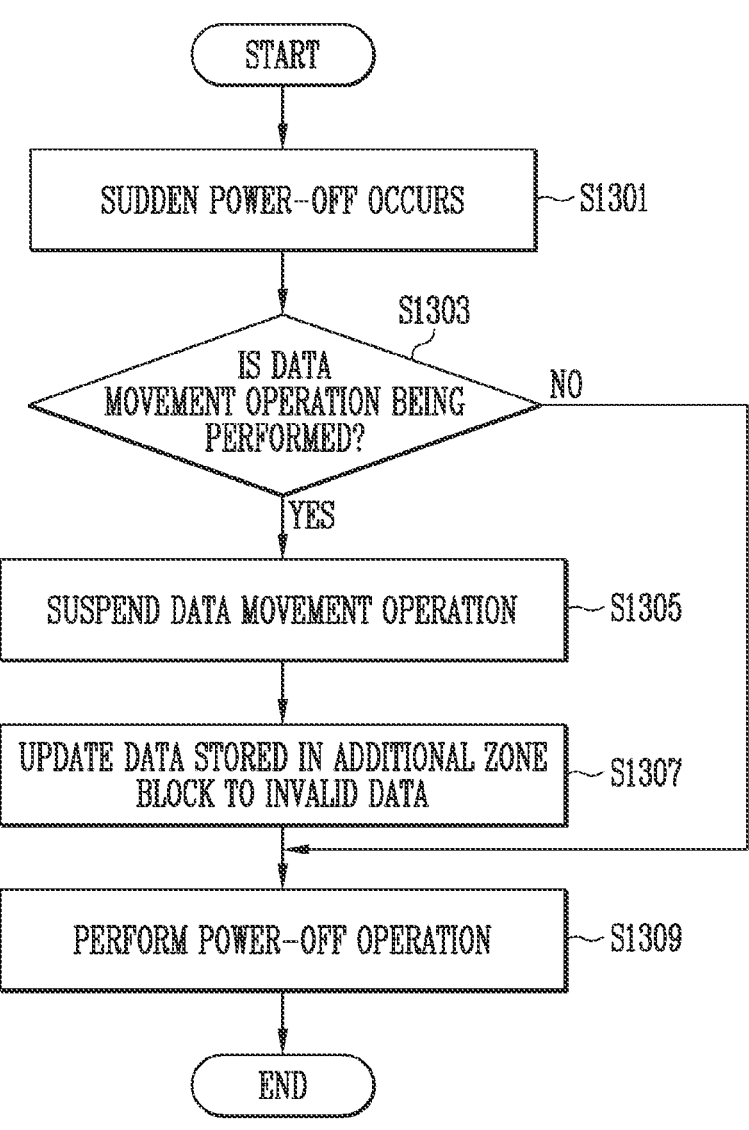
FIG. 13 is a flowchart for describing a data movement operation of a memory system corresponding to a sudden power-off according to an embodiment of the present disclosure.

FIG. 13 is a flowchart for describing the data movement operation of the memory system corresponding to a sudden power-off according to an embodiment of the present disclosure.

Referring to FIG. 13, a sudden power-off may occur at operation S1301.

At operation S1303, the memory system 50 may determine whether a data movement operation is being performed. When it is determined that the data movement operation is being performed, operation S1305 may be performed. On the other hand, when it is determined that a data movement operation is not performed, operation S1309 may be performed.

At operation S1305, the memory system 50 may suspend the data movement operation.

At operation S1307, the memory system 50 may update data stored in an additional zone block to invalid data.

At operation S1309, the memory system 50 may perform a power-off operation. The power-off operation may include a dump operation of storing data, stored in the buffer memory, in the memory device.

Figure 14:
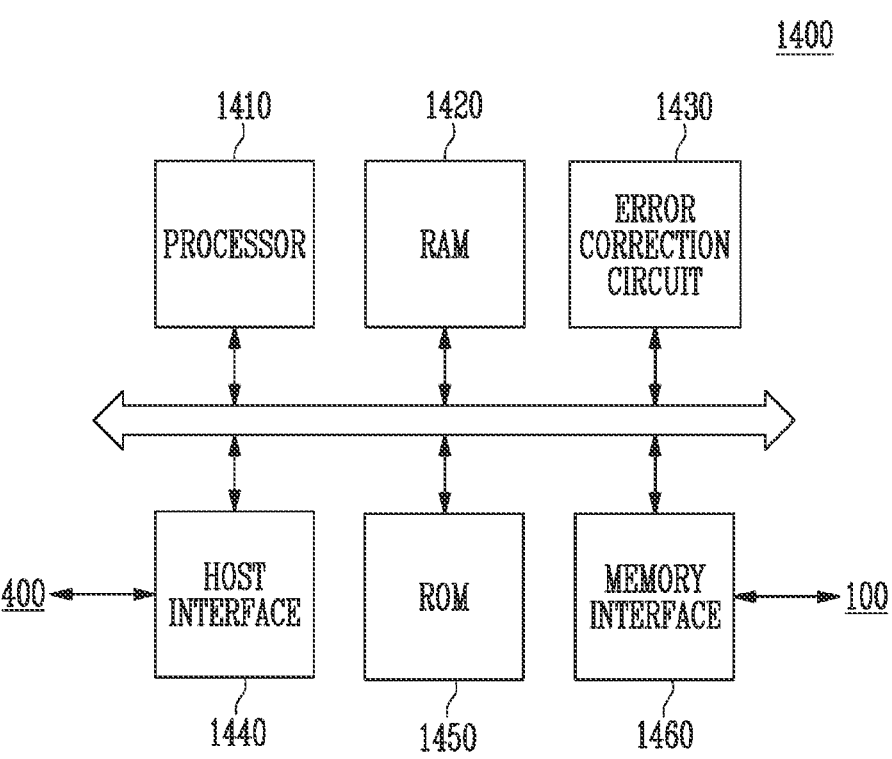
FIG. 14 is a diagram illustrating a memory controller of FIG. 1 according to an embodiment of the present disclosure.

FIG. 14 is a diagram illustrating the memory controller of FIG. 1 according to an embodiment of the present disclosure.

The memory controller 1400 of FIG. 14 may be the memory controller 200 of FIG. 1 according to an embodiment of the present disclosure.

Referring to FIG. 14, the memory controller 1400 may include a processor 1410, a random access memory (RAM) 1420, an error correction circuit 1430, a host interface 1440, a read only memory (ROM) 1450, and a memory interface 1460.

The processor 1410 may control the overall operation of the memory controller 1400. The processor 1410 may control the operation of the memory controller 1400 to store data requested by a host 400 in the memory device 100.

The RAM 1420 may be used as a buffer memory, a cache memory or a working memory of the memory controller 1400. In an embodiment, the RAM 1420 may allocate a plurality of zones, respectively corresponding to logical address groups provided by the host, to the logical address groups. In an embodiment, the RAM 1420 may include information related to zone blocks and map data.

The error correction circuit 1430 may perform error correction. The error correction circuit 1430 may perform error correction code (ECC) encoding based on data to be written to the memory device 100 through the memory interface 1460. The ECC-encoded data may be transferred to the memory device 100 through the memory interface 1460. The error correction circuit 1430 may perform error correction decoding (ECC decoding) on data received from the memory device 100 through the 20 memory interface 1460. In an embodiment, the error correction circuit 1430 may be included, as a component of the memory interface 1460, in the memory interface 1460.

The ROM 1450 may store various types of information required for the operation of the memory controller 1400 in the form of firmware.

The memory controller 1400 may communicate with an external device (e.g., the host 400, an application processor, or the like) through the host interface 1440. The memory controller 1400 may be provided with data through the host interface 1440.

The memory controller 1400 may communicate with the memory device 100 through the memory interface 1460. The memory controller 1400 may transmit a command, an address, a control signal, etc. to the memory device 100 and receive data from the memory device 100 through the memory interface 1460. In an example, the memory interface 1460 may include a NAND interface.

Figure 15:
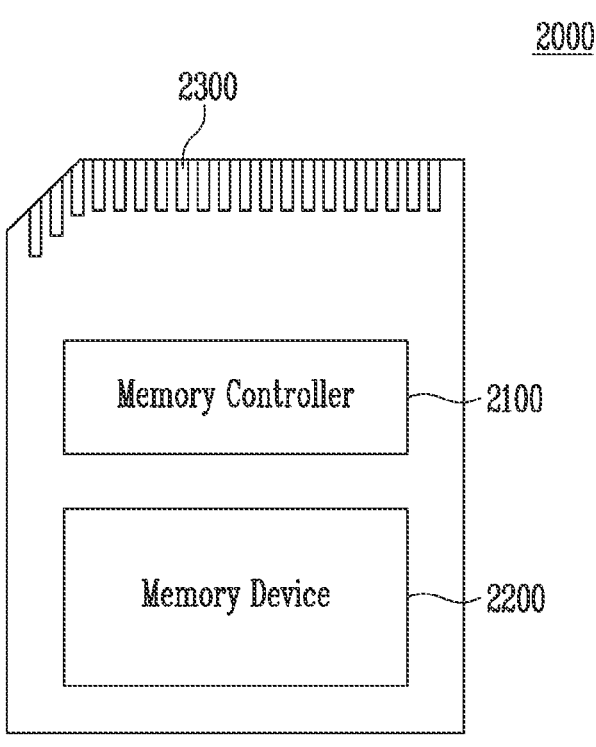
FIG. 15 is a block diagram illustrating a memory card system to which a memory system according to an embodiment of the present disclosure is applied.

FIG. 15 is a block diagram illustrating a memory card system to which a memory system according to an embodiment of the present disclosure is applied.

Referring to FIG. 15, a memory card system 2000 may include a memory controller 2100, a memory device 2200, and a connector 2300.

The memory controller 2100 is coupled to the memory device 2200. The memory controller 2100 may access the memory device 2200. For example, the memory controller 2100 may control read, write, erase, and background operations of the memory device 2200. The memory controller 2100 may provide an interface between the memory device 2200 and a host. The memory controller 2100 may run firmware for controlling the memory device 2200. The memory controller 2100 may be implemented in the same manner as the memory controller 200, described above with reference to FIG. 1. The memory device 2200 may be implemented in the same manner as the memory device 100, described above with reference to FIG. 1.

In an embodiment, the memory controller 2100 may include components, such as a RAM, a processor, a host interface, a memory interface, and an error correction circuit.

The memory controller 2100 may communicate with an external device through the connector 2300. The memory controller 2100 may communicate with an external device (e.g., a host) based on a specific communication standard or interface. In an embodiment, the memory controller 2100 may communicate with the external device through at least one of various communication standards or interfaces such as universal serial bus (USB), multimedia card (MMC), embedded MMC (eMMC), peripheral component interconnection (PCI), PCI-express (PCI-E), advanced technology attachment (ATA), serial-ATA (SATA), parallel-ATA (PATA), small computer system interface (SCSI), enhanced small disk interface (ESDI), integrated drive electronics (IDE), Firewire, universal flash storage (UFS), Wi-Fi, Bluetooth, and nonvolatile memory express (NVMe). In an embodiment, the connector 2300 may be defined by at least one of the above-described various communication standards or interfaces.

In an embodiment, the memory device 2200 may be implemented as any of various nonvolatile memory devices, such as an Electrically Erasable and Programmable ROM (EEPROM), a NAND flash memory, a NOR flash memory, a Phase-change RAM (PRAM), a Resistive RAM (Re-RAM), a Ferroelectric RAM (FRAM), a Spin Transfer Torque magnetic RAM (STT-MRAM).

The memory controller 2100 and the memory device 2200 may be integrated into a single semiconductor device to configure a memory card. For example, the memory controller 2100 and the memory device 2200 may be integrated into a single semiconductor device to configure a memory card such as a PC card (personal computer memory card international association: PCMCIA), a compact flash card (CF), a smart media card (SM or SMC), a memory stick, a multimedia card (MMC, RS-MMC, MMCmicro or eMMC), a SD card (SD, miniSD, microSD, or SDHC), or a universal flash storage (UFS).

Figure 16:
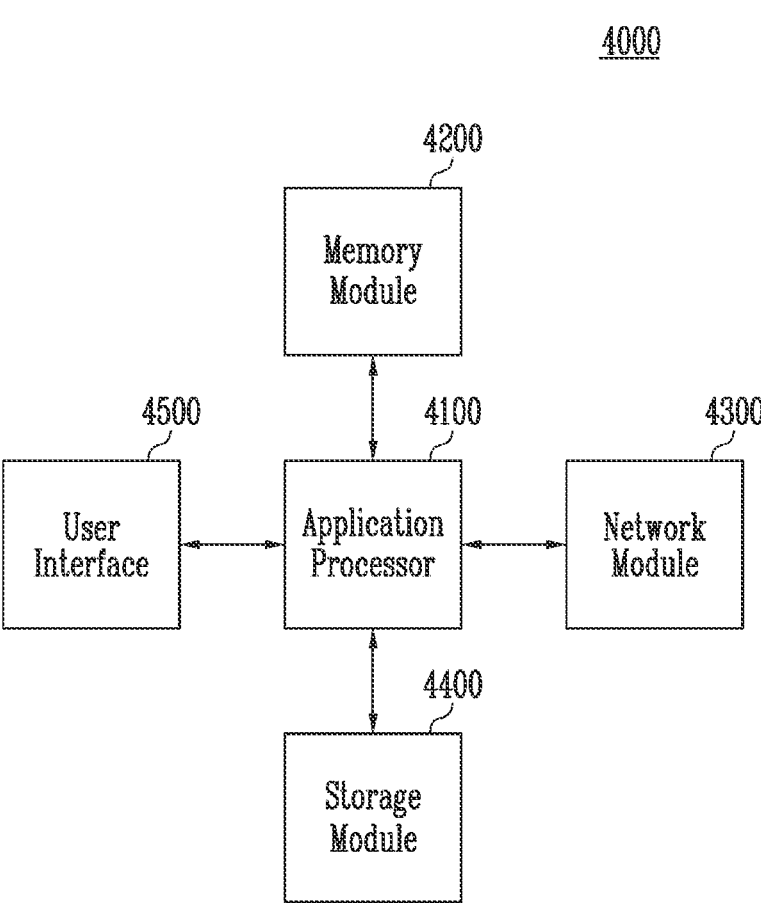
FIG. 16 is a block diagram illustrating a user system to which a memory system according to an embodiment of the present disclosure is applied.

FIG. 16 is a block diagram illustrating a user system to which a memory system according to an embodiment of the present disclosure is applied.

Referring to FIG. 16, a user system 4000 may include an application processor 4100, a memory module 4200, a network module 4300, a storage module 4400, and a user interface 4500.

The application processor 4100 may run components included in the user system 4000, an Operating System (OS) or a user program. In an embodiment, the application processor 4100 may include controllers, interfaces, graphic engines, etc. for controlling the components included in the user system 4000. The application processor 4100 may be provided as a system-on-chip (SoC).

The memory module 4200 may function as a main memory, a working memory, a buffer memory or a cache memory of the user system 4000. The memory module 4200 may include volatile RAMs such as DRAM, SDRAM, DDR SDRAM, DDR2 SDRAM, DDR3 SDRAM, LPDDR SDRAM, LPDDR2 SDRAM, and LPDDR3 SDRAM, or nonvolatile RAMs such as PRAM, ReRAM, MRAM, and FRAM. In an embodiment, the application processor 4100 and the memory module 4200 may be packaged based on package-on-package (POP) and may then be provided as a single semiconductor package.

The network module 4300 may communicate with external devices. For example, the network module 4300 may support wireless communication, such as Code Division Multiple Access (CDMA), Global System for Mobile communication (GSM), wideband CDMA (WCDMA), CDMA-2000, Time Division Multiple Access (TDMA), Long Term Evolution (LTE), WiMAX, WLAN, UWB, Bluetooth, or Wi-Fi communication. In an embodiment, the network module 4300 may be included in the application processor 4100.

The storage module 4400 may store data. For example, the storage module 4400 may store data received from the application processor 4100. Alternatively, the storage module 4400 may transmit the data stored in the storage module 4400 to the application processor 4100. In an embodiment, the storage module 4400 may be implemented as a nonvolatile semiconductor memory device, such as a Phase-change RAM (PRAM), a Magnetic RAM (MRAM), a Resistive RAM (RRAM), a NAND flash memory, a NOR flash memory, or a NAND flash memory having a three-dimensional (3D) structure. In an embodiment, the storage module 4400 may be provided as a removable storage medium (i.e., removable drive), such as a memory card or an external drive of the user system 4000.

In an embodiment, the storage module 4400 may include a plurality of nonvolatile memory devices, each of which may be operated in the same manner as the memory device 100 described above with reference to FIG. 1. The storage module 4400 may be operated in the same manner as the memory system 50 described above with reference to FIG. 1.

The user interface 4500 may include interfaces which input data or instructions to the application processor 4100 or output data to an external device. In an embodiment, the user interface 4500 may include user input interfaces such as a keyboard, a keypad, a button, a touch panel, a touch screen, a touch pad, a touch ball, a camera, a microphone, a gyroscope sensor, a vibration sensor, and a piezoelectric device. The user interface 4500 may further include user output interfaces such as a Liquid Crystal Display (LCD), an Organic Light Emitting Diode (OLED) display device. an Active Matrix OLED (AMOLED) display device, an LED, a speaker, and a monitor.

In accordance with the present disclosure, there are provided a memory controller that is capable of improving the speed at which data stored in a memory device is moved, and a memory system including the memory controller.

While the present invention has been described with respect to the specific embodiments, it will be apparent to those skilled in the art that various changes and modifications may be made without departing from the spirit and scope of the invention as defined in the following claims. Furthermore, the embodiments may be combined to form additional embodiments.

What is claimed is:

1. A memory system comprising:
a plurality of memory devices, each including a plurality of zone blocks;
a buffer memory configured to store pieces of map data that are respectively allocated to a plurality of zones corresponding to logical address groups provided by a host and that indicate correspondence relationships between the plurality of zones and physical addresses of the plurality of zone blocks; and
a memory controller configured to:
perform a data movement operation of moving data stored in a zone block allocated to one of the plurality of zones to an additional zone block based on information related to the plurality of zone blocks, the additional zone block being allocated to the one of the plurality of zones, and
update, after completion of the data movement operation on the zone block and the additional zone block, a physical address of the zone block corresponding to the one of the plurality of zones to a physical address of the additional zone block,
wherein the memory controller during the data movement operation is configured to, when a zone reset request is received from the host, suspend the data movement operation which is moving the data stored in the zone block to the additional block, update any of the data moved into the additional zone block to invalid data, and erase the zone block from which the data was moved.

2. The memory system according to claim 1, wherein the information related to the plurality of zone blocks includes erase count information, read count information, information about a number of fail bits, information about a bad block, or information about valid data, for each of the plurality of zone blocks.

3. The memory system according to claim 2, wherein the memory controller is configured to control the data movement operation based on a write pointer indicating a location of data stored last in the zone block.

4. The memory system according to claim 3, wherein the data stored in the zone block includes valid data and invalid data.

5. The memory system according to claim 1, wherein the memory controller is configured to, when a read request is received from the host while the data movement operation is being performed, read the data stored in the zone block.

6. The memory system according to claim 1, wherein the memory controller is configured to, when a read request is received from the host after the data movement operation is terminated, read data stored in the additional zone block.

7. The memory system according to claim 1, wherein the memory controller is configured to, when a write request is received from the host, store data corresponding to the write request in the additional zone block after the data movement operation is terminated.

8. The memory system according to claim 1, wherein the memory controller is configured to, when a zone offline request for changing the one zone to an unavailable state is received from the host, suspend the data movement operation and update data stored in the additional zone block to invalid data.

9. The memory system according to claim 1, wherein the memory controller is configured to suspend the data movement operation and update data stored in the additional zone block to invalid data in response to a sudden power-off.

* * * * *